United States Patent [19]

Inoue

[11] Patent Number: 4,809,106

[45] Date of Patent: Feb. 28, 1989

[54] LEAD SCREW/TRANSDUCER ALIGNING MECHANISM FOR DISK DRIVE APPARATUS

[75] Inventor: Kazuhiko Inoue, Tokyo, Japan

[73] Assignee: Teac Corporation, Tokyo, Japan

[21] Appl. No.: 39,083

[22] Filed: Apr. 16, 1987

[30] Foreign Application Priority Data

Apr. 21, 1986 [JP] Japan ................................ 61-60430

[51] Int. Cl.⁴ .......................... G11B 5/55; G11B 21/08
[52] U.S. Cl. ...................................... 360/106; 360/109
[58] Field of Search ...................... 360/106, 104–105, 360/109; 74/89.15, 458

[56] References Cited

U.S. PATENT DOCUMENTS

| | | | |
|---|---|---|---|
| 3,770,905 | 11/1973 | Sperry | 360/106 |
| 4,030,137 | 6/1977 | Dalziel | 360/106 |
| 4,097,908 | 6/1978 | Chou et al. | 360/109 X |
| 4,139,877 | 2/1979 | Townsend | 360/106 |
| 4,700,251 | 10/1987 | Fuke et al. | 360/109 X |

Primary Examiner—Stuart N. Hecker
Assistant Examiner—David J. Severin
Attorney, Agent, or Firm—Woodcock Washburn Kurtz Mackiewicz & Norris

[57] ABSTRACT

A bidirectional stepper motor having a lead screw coupled thereto is mounted to a sliding base which has two right-angular contact surfaces for sliding contact with two right-angular reference surfaces formed on a fixed platform of the machine. Fixedly mounted to the platform and extending parallel to both reference surfaces, a guide rod has a transducer carriage slidably mounted thereto for guiding the same in a radial direction of a flexible magnetic disk or like record media. The transducer carriage is mated with the lead screw for linearly transporting the transducer from track to track on the disk upon incremental rotation of the stepper motor. The sliding base is sprung against one of the two reference surfaces and is fastened to the other reference surface by screws inserted in and through clearance holes in the sliding base. Before fully tightening the screw, the sliding base may be moved by a suitable tool back and forth along the two reference surfaces, within the limits determined by the clearance with which the screws pass through the clearance holes in the sliding base, for fine adjustment of the longitudinal position of the lead screw with respect to the radial position of the transducer on the magnetic disk.

6 Claims, 2 Drawing Sheets

LEAD SCREW/TRANSDUCER ALIGNING MECHANISM FOR DISK DRIVE APPARATUS

BACKGROUND OF THE INVENTION

My invention relates generally to apparatus having a transducer such as a magnetic read/write head for data transfer with a disklike record medium such as a flexible magnetic disk, with the transducer transported radially of the record medium by a positioning mechanism including a lead screw. More specifically, my invention pertains to improved means in such data transfer apparatus for easy, precise adjustment, at the time of the assemblage of the apparatus, of the longitudinal position of the lead screw with respect to the radial position of the transducer on the record medium.

In apparatus for data transfer (writing and/or reading) with flexible magnetic disks, a head positioning mechanism is employed for moving the magnetic head radially of the magnetic disk across a series of concentric storage tracks thereon. Typically, the head positioning mechanism comprises a stepper motor and a mechanism for translating the bidirectional, incremental rotation of the stepper motor into the linear, stepwise travel of a carriage carrying the magnetic head. While a variety of motion translating mechanisms have been suggested and used, perhaps the most widely accepted in the art is a lead screw which is coupled directly to the stepper motor and which is matingly engaged with the head carriage either directly or via suitable means mounted to the carriage. U.S. Pat. No. 4,030,137 to Dalziel suggests an example of lead screw for use in the head positioning art.

One of the problems heretofore encountered in the use of lead screws for head positioning is how to obtain exact alignment, at the time of the manufacture or assemblage of the apparatus, between the longitudinal position of the lead screw relative to the head carriage and the position of the magnetic head on a preassigned track on the magnetic disk. The longitudinal position of the lead screw must be determined relative to the head carriage with the rotor of the stepping motor, and therefore of the lead screw itself, held in a prescribed start position, in order that the magnetic head may move to a desired track position on the magnetic disk upon stepping of the motor a required number of times.

Usually, the longitudinal position of the lead screw is adjusted with respect to the radial position of the magnetic head on the magnetic disk by manually moving the assembly of the lead screw and the stepping motor back and forth relative to the head carriage before the motor-and-lead-screw assembly is screwed fast to the framework of the data transfer apparatus. However, no matter how precisely such manual adjustment is made, misalignment has been prone to occur upon full tightening of the screws because of the resulting possible displacement of the motor-and-lead-screw assembly with respect to the framework.

SUMMARY OF THE INVENTION

I have briefly invented how to easily establish precise alignment between the longitudinal position of the lead screw relative to the head carriage and the position of the magnetic head on a preassigned track on the magnetic disk.

My invention may be summarized as a lead screw/transducer aligning mechanism for an apparatus for data transfer with a disklike record medium. The alignment mechanism comprises a stationary support structure having two planar reference surfaces formed thereon in right-angular relation to each other. A carriage carrying a transducer such as a magnetic read/write head is movable along a guide rod immovably mounted to the support structure and extending parallel to the first and second reference surfaces thereon. In order to be driven along the guide rod for transporting the transducer radially of the record medium, the carriage is mated with a lead screw which is coupled to a head positioning motor and which extends parallel to the guide rod. The motor with the lead screw is rigidly mounted to a sliding base to make up a motor-and-lead-screw assembly. The sliding base has two right-angular contact surfaces for sliding contact with the two reference surfaces of the support structure. A spring or like resilient means urges the sliding base against one of the reference surfaces. Also included are screws or like fastener means for fastening the sliding base to the support structure.

As will be understood from the foregoing summary, the longitudinal position of the lead screw is adjustable relative to the carriage, and hence to the transducer being held on a prescribed track position on the record medium, by manually moving the sliding base back and forth along the two right-angular reference surfaces of the support structure before fully tightening the screws on the sliding base. Being sprung against one of the reference surfaces, the sliding base will be hardly displaced over the support structure when the screws are tightened after the adjustment of the lead screw position with respect to the transducer position on the record medium.

An additional advantage of my invention is that the lead screw can be laid exactly parallel to the guide rod, the latter being immovably mounted to the support structure in parallel relation to the two fixed reference surfaces. All that is required for the establishment of such exactly parallel relation between lead screw and guide rod is to maintain the sliding base in contact with the two reference surfaces.

The above and other features and advantages of my invention and the manner of realizing them will become better understood, and the invention itself will best be understood, from a study of the following description and appended claims, with reference had to the attached drawings showing a preferred embodiment of my invention.

DESCRIPTION OF THE PREFERRED EMBODIMENT

Figure 1:
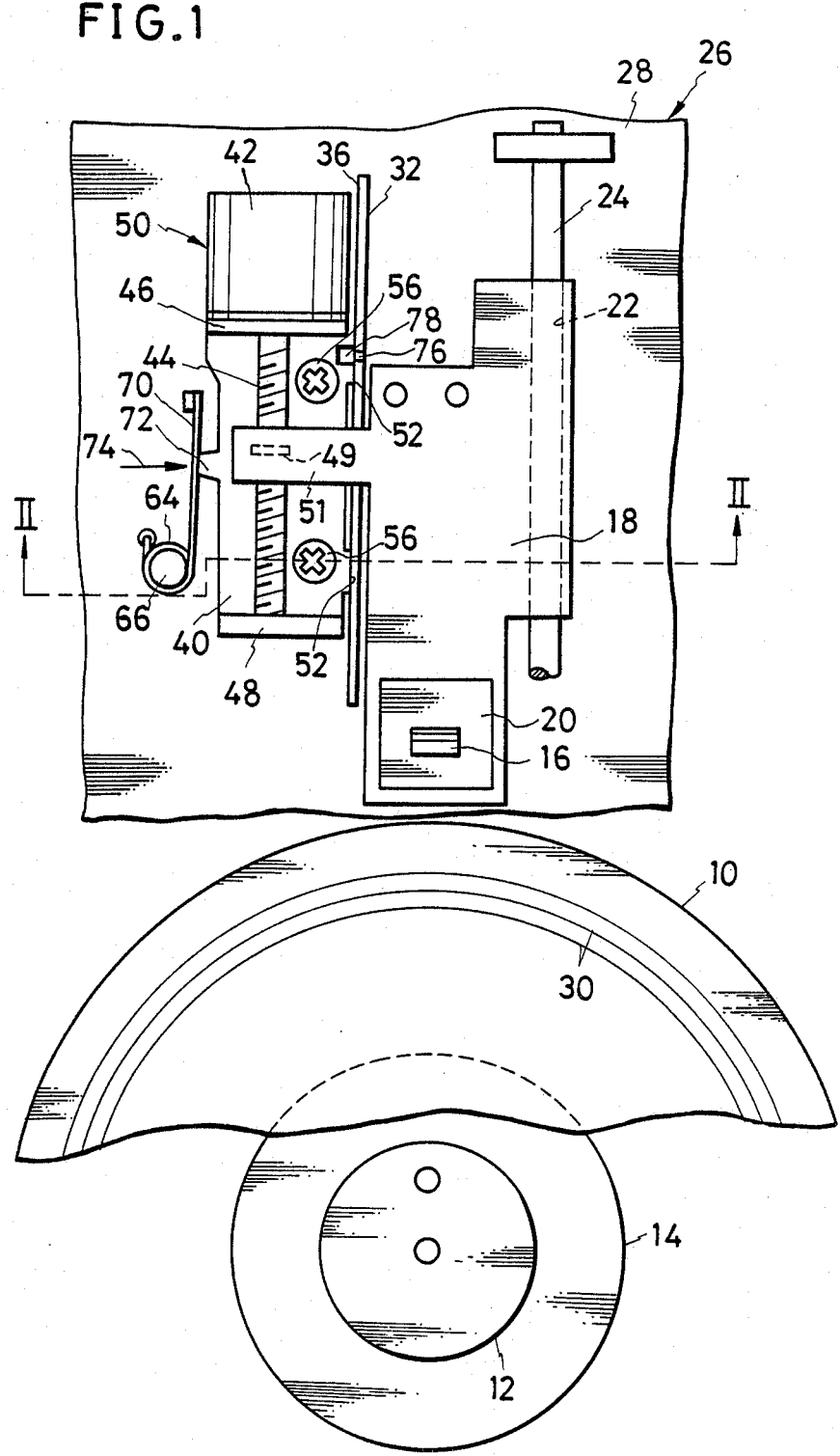
FIG. 1 is a fragmentary plan view of flexible magnetic disk drive apparatus, showing in particular its head positioning mechanism embodying the novel concepts of my invention.

I will now describe in detail the lead screw/transducer aligning mechanism of my invention as adapted for use with a head positioning mechanism of a flexible magnetic disk drive. Although in FIG. 1 I have illustrated the disk drive fragmentarily and insofar as is necessary for a full understanding of my invention, it will nevertheless be seen that it has a flexible magnetic disk 10 mounted in position on a turntable 12 for rotation therewith in a horizontal plane. The turntable 12 is coupled directly to a disk drive motor 14 thereby to be driven.

The transducer for data transfer with the magnetic disk 10 is shown as a magnetic read/write head 16 conventionally mounted on a carriage 18 of rigid plastic material via a flexure seat 20. This head is for data transfer contact with the lower side of the magnetic disk 10. Another similar head, not shown, may be suitably mounted on the carriage 18 for data transfer contact with the upper side of the magnetic disk 10.

Figure 2:
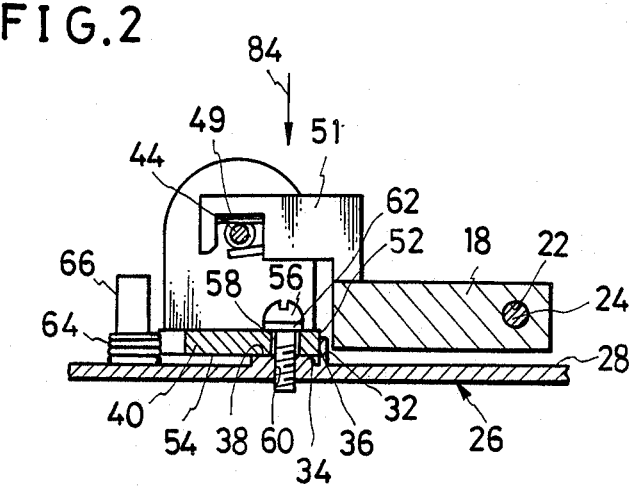
FIG. 2 is a section through the head positioning mechanism, taken along the line II—II in FIG. 1.

As shown also in FIG. 2, the carriage 18 has a hole 22 extending therethrough to slidably receive a guide rod 24. This guide rod is immovably mounted to the framework of the disk drive herein shown as a fixed metal-made platform 26. The platform 26 has a main surface 28 laid parallel to the plane of rotation of the magnetic disk 10. The guide rod 24 is mounted on this main surface 28 of the platform 26 in parallel spaced relation thereto. The orientation of the guide rod 24 with respect to the magnetic disk 10 is such that the magnetic head or heads 16 are movable radially of the disk across a series of concentric data storage tracks 30 thereon as the carriage 18 slides back and forth along the guide rod.

Figure 3:
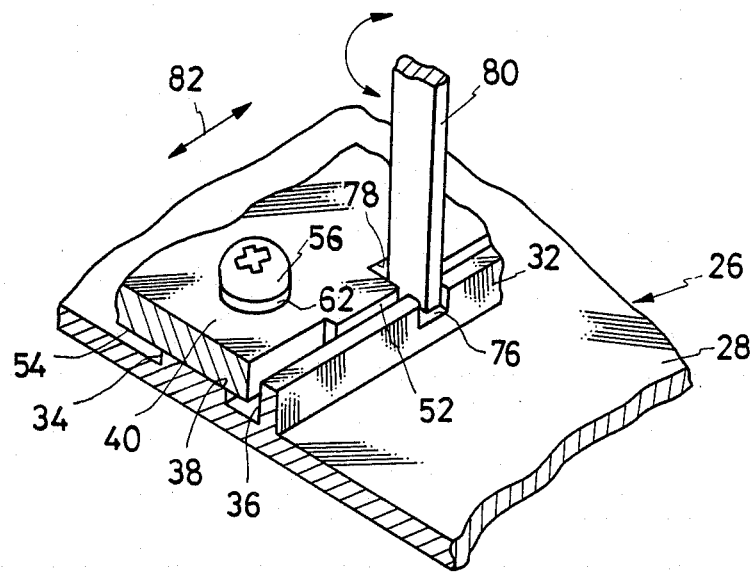
FIG. 3 is an enlarged, fragmentary perspective view showing the stationary support structure having the two right-angular reference surfaces formed thereon, and the sliding base mounted thereon, the view being explanatory of the way in which the sliding base is manually moved back and forth along the reference surfaces for the alignment of lead screw and transducer positions.

With reference to all of FIGS. 1-3 the platform 26 is formed to include a relatively thin first ridge 32 and a wider second ridge 34, both extending parallel to the guide rod 24. Taller than the second ridge 34, the first ridge 32 provides a first planar reference surface 36 which is directed away from the guide rod 24 and which is at a right angle with the main surface 28 of the platform 26. The second ridge 34 is disposed on that side of the first ridge 32 which is opposite to the side where the guide rod 24 is disposed. This second ridge 34 provides a second planar reference surface 38 parallel to the main surface 28 of the platform 26. It is thus seen that the first and second reference surfaces 36 and 38 are in right-anglular relation to each other, with the guide rod 24 laid parallel to the extensions of both reference surfaces.

Movable back and forth in sliding contact with both reference surfaces 36 and 38 is a metal-made sliding base 40 shown also in FIGS. 1-3. As best illustrated in FIG. 1, the sliding base 40 has rigidly mounted thereon a head positioning motor 42 of the electric stepping type, generally known as a stepper motor, having a lead screw 44 coupled directly thereto for driving the same. The lead screw 44 extends exactly parallel to the guide rod 24, provided that the sliding base 40 in contact with both reference surfaces 36 and 38. The sliding base 40 has two upstanding webs 46 and 48 formed in one piece therewith both for rigidly supporting the stepper motor 42 and for rotatably supporting the lead screw 44.

As shown in FIG. 1 and more clearly in FIG. 2, the lead screw 44 is matingly engaged with the carriage 18, as via a pin 49 mounted fast to an arm 51 extending laterally from the carriage. The lead screw 44 and pin 49 make up a known motion translating mechanism, operating to translate the bidirectional, incremental rotation of the stepper motor 42 into the bidirectional, linear, stepwise travel of the carriage 18 along the guide rod 24, and hence of the magnetic head or heads 16 thereon from track to track on the magnetic disk 10.

The sliding base 40, stepper motor 42 and lead screw 44 constitute in combination a motor-and-lead-screw assembly generally labeled 50. The complete motor-and-lead-screw assembly 50 is slidable along the two right-angular reference surfaces 36 and 38 for fine adjustment of the longitudinal position of the lead screw 44 to the radial position of the head or heads 16 on the magnetic disk 10. As indicated in both FIGS. 2 and 3, the sliding base 40 has a first contact surface 52 for sliding contact with the first reference surface 36, and a second contact surface 54 for sliding contact with the second reference surface 38. As the two reference surfaces 36 and 38 are at a right angle to each other, so, of course, are the two contact surfaces 52 and 54 of the sliding base 40.

FIG. 1 shows that the sliding base 40 is fastened to the platform 26 by two threaded fasteners herein shown as screws 56 extending perpendicular to the second reference surface 38 and hence to the main surface 28 of the platform. As will be noted from FIG. 2, each screw 56 extends with clearance through a hole 58 in the sliding base 40 and is engaged in a tapped hole 60 in the second ridge 34 and platform 26. A washer 62, preferably a spring washer, is mounted underneath the head of each screw 56 not only to improve tightness but for an additional purpose to which I will refer presently.

As shown at 64 in FIGS. 1 and 2, a torsion spring is coiled about an upstanding pin 66 on the main surface 28 of the platform 26. An arm 70 of the torsion spring 64 is held against a lateral projection 72 of the sliding base 40, urging the sliding base against the first reference surface 36, as indicated by the arrow 74 in FIG. 1.

As seen in both FIGS. 1 and 3, the first ridge 32 of the platform 26 and the sliding base 40 has a pair of aligning recesses 76 and 78 formed contiguously therein. These recesses are to receive a suitable aligning tool such as a screwdriver 80 whereby the sliding base 40 is to be adjustably moved back and forth along the first and second reference surfaces 36 and 38, as will be explained in more detail in the course of the following description of operation.

OPERATION

The incremental rotation of the stepper motor 42 with the lead screw 44 correspondingly steps the carriage 18, and hence the magnetic head or heads 16, radially of the magnetic disk 10 from one track to another. The pitch of the threads on the lead screw 44 must be so determined that the magnetic head or heads 16 move a unit pitch distance of the magnetic disk tracks 30 upon rotation of the stepper motor 42 through a predetermined increment. In order to enable the stepper motor 42 to access the head or heads 16 to a desired track in response to an appropriate seek signal, exact correspondence must be established, at the time of the assemblage of the disk drive of the above described construction, between the angular position of the rotor, not shown, of the stepper motor and the radial position of the head or heads on the magnetic disk 10. Further, for the same objective, the longitudinal position of the lead screw 44 must be adjusted relative to the carriage 18 so that the magnetic head or heads 16 thereon will be in a preassigned track position when the rotor of the stepper motor 42 is in a preassigned angular position. My invention is designed to expedite this adjustment of the longitudinal position of the lead screw 44 with respect to the carriage 18.

Preparatory to the commencement of such adjustment, the screws 56 may be inserted in and through the clearance holes 58 in the sliding base 40 and engaged in the tapped holes 60 in the platform 26, only to such an extent that the sliding base is movable back and forth along the two right-angular reference surfaces 36 and 38 within the limits determined by the clearance with which the screws 56 extend through the clearance holes 58.

Then, as illustrated in FIG. 3, the end of a screwdriver 80 may be inserted in the pair of aligning recesses 76 and 78. The screwdriver 80 may be turned in either direction. Fulcrumed by the stationary edges of the recess 76 in the first ridge 32, the screwdriver 80 will pivot to move the sliding base 40, and therefore the complete motor-and-lead screw assembly 50, back and forth along the reference surfaces 36 and 38, as indicated by the double-headed arrow 82 in FIG. 3.

It should be appreciated that, while being so moved back and forth, the sliding base 40 is forced against the first reference surface 36 by the torsion spring 64, as indicated by the arrow 74 in FIG. 1, and against the second reference surface 38 by the spring washers 62 underlying the heads of the screws 56, as indicated by the arrow 84 in FIG. 2. Consequently, the sliding base 40 will move infallibly in sliding contact with both reference surfaces 36 and 38, and only to the extent desired by the operator.

The screws 56 may be fully tightened following the establishment of alignment between the longitudinal position of the lead screw 44 with respect to the carriage 18 and the radial position of the magnetic head or heads 16 on the magnetic disk 10. The full tightening of the screws 56 will invite no displacement of the sliding base 40, and of the lead screw 44, because the sliding base is being forced as aforesaid against the two right-angular reference surfaces 36 and 38. Thus, unlike the case heretofore experienced, no misalignment will take place upon full tightening of the screws. It is also noteworthy that the lead screw 44 can be mounted exactly parallel to the fixed guide rod 24 as the sliding base 40 is constantly sprung against the first reference surface 36.

Notwithstanding the foregoing detailed disclosure, I do not wish my invention to be limited by the exact details of the illustrated embodiment since a variety of modifications thereof will readily occur to one skilled in the art within the broad teaching hereof. The following is a brief list of such possible modifications:

1. The second ridge 34 with the second reference surface 38 is dispensible if the sliding base 40 is placed directly on the main surface 28 of the platform 26. In this case the main surface of the platform will serve as the second reference surface at a right angle to the first reference surface 36.

2. The sliding base 40 may be urged against the second reference surface 38 not by the spring washers 62 but by other springs or like resilient means provided in any convenient locations.

3. Not only the spring washers 62 but any other resilient means may not be provided for biasing the sliding base 40 against the second reference surface 38, the motor-and-lead-screw assembly 50 being urged against the second reference surface under its own weight if the disk drive is laid horizontally, that is, with its disk drive motor 14 in an upstanding attitude.

4. The lead screw 44 may be mated with the carriage 18 via a ball or balls or other engagement means, instead of via the pin 49, or may be engaged with internal threads formed directly on the carriage.

5. The invention may be adapted for optical disk apparatus wherein a transducer in the form of an optical head is fed radially of an optical disk for data transfer therewith.

What I claim is:

1. A lead screw/transducer aligning mechanism for an apparatus for data transfer with a disklike record medium, comprising:
   (a) a stationary support structure having two planar reference surfaces formed thereon in right-angular relation to each other;
   (b) a guide rod immovably mounted to the support structure and extending parallel to the two reference surfaces of the support structure;
   (c) a carriage mounted to the guide rod for reciprocating movement along the same;
   (d) a transducer mounted to the carriage for joint movement therewith in a radial direction of the record medium;
   (e) a sliding base having two right-angular contact surfaces for sliding contact respectively with the two reference surfaces of the support structure;
   (f) a transducer positioning motor fixedly mounted to the sliding base;
   (g) a lead screw extending parallel to the guide rod and coupled to the motor to be driven thereby, the lead screw being matingly engaged with the carriage for causing the linear travel of the carriage along the guide rod in response to the rotation of the lead screw, the motor and lead screw being movable jointly with the sliding base;
   (h) first resilient means for biasing the sliding base against one of the reference surfaces of the support structure;
   (i) second resilient means for biasing the sliding base against the other of the reference surfaces;
   (j) there being a pair of aligning recesses formed contiguously in the support structure and the sliding base; and
   (k) fastener means for fastening the sliding base to the support structure, the fastener means permitting, before fastening the sliding base to the support structure, the sliding base to be adjustably moved back and forth in sliding contact with the reference surfaces of the support structure by means of an aligning tool operatively engaged in the aligning recesses, the sliding base being maintained in proper contact with the two reference surfaces under the forces of the first and second resilient means during such positional adjustment and subsequent fastening to the support structure.

2. The lead screw/transducer aligning mechanism as set forth in claim 1, wherein the first resilient means comprises a torsion spring mounted to the support structure and having an arm held against the sliding base.

3. The lead screw/transducer aligning mechanism as set forth in claim 1, wherein the second resilient means comprises spring washers used in combination with the fastener means.

4. In apparatus for data transfer with a disklike record medium rotating in a prescribed plane, in combination;
   (a) frame means having a main surface parallel to the plane of rotation of the record medium;
   (b) a ridge formed on the main surface of the frame means to provide a fixed reference surface at a right angle with the main surface;
   (c) a guide rod immovably mounted to the frame means and extending parallel to both the main surface of the frame means and the reference surface;
   (d) a carriage movable back and forth along the guide rod;
   (e) a transducer mounted to the carriage and movable therewith for data transfer with the record medium;
   (f) a sliding base having two right-angular contact surfaces for sliding contact respectively with the main surface of the frame means and the reference surface;
   (g) there being a plurality of clearance holes formed through the sliding base, each clearance hole extending perpendicular to the main surface of the frame means;
   (h) a transducer positioning motor mounted to the sliding base;
   (i) a lead screw extending parallel to the guide rod and coupled to the motor to be driven thereby, the lead screw being matingly engaged with the carriage for causing the linear travel of the carriage along the guide rod upon rotation of the lead screw, the motor and lead screw being movable jointly with the sliding base;
   (j) resilient means on the frame means for biasing the sliding base against the reference surface;
   (k) a plurality of threaded fasteners extending with clearance through the clearance holes in the sliding base and threadedly engaged with the frame means for fastening the sliding base to the frame means, the threaded fasteners being loosenable to permit the sliding base to be adjustably moved back and forth, within limits determined by the clearance with which the threaded fasteners extend through the clearance holes, in sliding contact both with the main surface of the frame means and with the reference surface for fine adjustment of the position of the lead screw with respect to the position of the transducer on the record medium;
   (l) a plurality of spring washers used one with each threaded fastener for assuring tight fastening of the sliding base to the frame means, the spring washers being also effective for biasing the sliding base against the main surface of the frame means during the fine positional adjustment of the lead screw and during the subsequent tightening of the threaded fasteners, so that the sliding base is biased both against the reference surface and against the main surface of the frame means during such operations.

5. The apparatus as set forth in claim 4, wherein the frame means is formed to include a second ridge providing a second reference surface parallel to the main surface thereof, the sliding base being in sliding contact with both the first and second reference surfaces.

6. The apparatus as set forth in claim 4, wherein a pair of aligning recesses are formed contiguously in the ridge on the main surface of the frame means and in the sliding base, the aligning recesses being for use in adjustably moving the sliding base relative to the frame means by means of an aligning tool operatively engaged therein.

* * * * *